United States Patent
Larsson et al.

(10) Patent No.: US 11,797,017 B2
(45) Date of Patent: Oct. 24, 2023

(54) METHOD FOR CONTROLLING A FLEET OF AUTONOMOUS/REMOTELY OPERATED VEHICLES

(71) Applicant: EINRIDE AB, Stockholm (SE)

(72) Inventors: Christian Larsson, Stockholm (SE); Niklas Lundin, Kungsbacka (SE)

(73) Assignee: Einride AB, Stockholm (SE)

( * ) Notice: Subject to any disclaimer, the term of this patent is extended or adjusted under 35 U.S.C. 154(b) by 0 days.

(21) Appl. No.: 17/910,245

(22) PCT Filed: Mar. 2, 2021

(86) PCT No.: PCT/SE2021/050173
§ 371 (c)(1),
(2) Date: Sep. 8, 2022

(87) PCT Pub. No.: WO2021/183019
PCT Pub. Date: Sep. 16, 2021

(65) Prior Publication Data
US 2023/0133577 A1 May 4, 2023

(30) Foreign Application Priority Data
Mar. 9, 2020 (SE) .................... 2050260-5

(51) Int. Cl.
G05D 1/02 (2020.01)
G05D 1/00 (2006.01)
(52) U.S. Cl.
CPC ......... *G05D 1/0223* (2013.01); *G05D 1/0027* (2013.01); *G05D 1/0038* (2013.01); *G05D 1/0061* (2013.01); *G05D 2201/0213* (2013.01)

(58) Field of Classification Search
CPC .. G05D 1/0223; G05D 1/0027; G05D 1/0038; G05D 1/0061; G05D 2201/0213
See application file for complete search history.

(56) References Cited

U.S. PATENT DOCUMENTS 9,720,410 B2  8/2017 Fairfield et al.
9,922,553 B2  3/2018 McErlean
(Continued)

FOREIGN PATENT DOCUMENTS

EP  2280386 A1  2/2011
GB  2539422 B   12/2016
(Continued)

OTHER PUBLICATIONS

International Search Report and Written Opinion for PCT/EP2019//065513.
(Continued)

*Primary Examiner* — Nadeem Odeh
(74) *Attorney, Agent, or Firm* — AWA Sweden AB; Thomas L. Ewing

(57) ABSTRACT

Embodiments of the invention relate to a method for controlling a fleet of at least two autonomous/remotely operated vehicles, wherein an embodiment of the method comprises: assigning to each of said at least two vehicles a predetermined route comprising a road segment which requires that a teleoperator of a remote operation station assists and/or drives the vehicle, determining a time overlap of the said road segments, and based on the determined time overlap, inserting a delay or a speedup in a preceding autonomous drive road segment of the predetermined route of at least one of said at least two autonomous/remotely operated vehicles so that said road segments no longer overlap in time.

20 Claims, 5 Drawing Sheets

(56) References Cited

U.S. PATENT DOCUMENTS

| | | |
|---|---|---|
| 10,328,805 B1 | 6/2019 | Wyrobek et al. |
| 10,444,754 B2 | 10/2019 | Fairfield et al. |
| 10,795,378 B2 | 10/2020 | Lisewski et al. |
| 2012/0022904 A1 | 1/2012 | Mason et al. |
| 2012/0158229 A1 | 6/2012 | Schaefer |
| 2013/0030630 A1 | 1/2013 | Luke |
| 2014/0104077 A1 | 4/2014 | Engel et al. |
| 2014/0180501 A1 | 6/2014 | Kyllmann |
| 2014/0316630 A1 | 10/2014 | Kohlberger |
| 2015/0100188 A1 | 4/2015 | Wagner |
| 2015/0248131 A1 | 9/2015 | Fairfield et al. |
| 2016/0247106 A1 | 8/2016 | Dalloro et al. |
| 2016/0370801 A1 | 12/2016 | Fairfield et al. |
| 2017/0129359 A1 | 5/2017 | Dunlap et al. |
| 2017/0178498 A1 | 6/2017 | McErlean |
| 2017/0227369 A1 | 8/2017 | Wang et al. |
| 2017/0248963 A1 | 8/2017 | Levinson |
| 2017/0267343 A1 | 9/2017 | Chen et al. |
| 2018/0136651 A1 | 5/2018 | Levinson et al. |
| 2018/0141552 A1 | 5/2018 | Marcicki |
| 2018/0356837 A1 | 12/2018 | Lisewski et al. |
| 2019/0294160 A1* | 9/2019 | Shintani ............. G01C 21/3407 |
| 2019/0339692 A1* | 11/2019 | Sakai .................. G05D 1/0027 |
| 2021/0041894 A1* | 2/2021 | Urano ................. G08G 1/0969 |
| 2022/0217237 A1* | 7/2022 | Sasaki .................... G06Q 50/26 |

FOREIGN PATENT DOCUMENTS

| | | |
|---|---|---|
| WO | WO2011012882 A1 | 2/2011 |
| WO | WO2013166096 A1 | 11/2013 |

OTHER PUBLICATIONS

International Search Report and Written Opinion for PCT/EP2018/082667.

International Search Report and Written Opinion for PCT/EP2018/085410.

International Search Report and Written Opinion for PCT/SE2021/050173.

International Preliminary Report on Patentability for PCT/SE2021/050173.

* cited by examiner

METHOD FOR CONTROLLING A FLEET OF AUTONOMOUS/REMOTELY OPERATED VEHICLES

CROSS-REFERENCE TO RELATED APPLICATIONS

This is a national phase application based on the PCT International Patent Application No. PCT/SE2021/050173 filed Mar. 2, 2021, itself claiming priority from SE 2050260-5 filed Mar. 9, 2020, the entire contents of both prior applications which are incorporated herein by reference.

TECHNICAL FIELD OF THE INVENTION

The present disclosure relates to a method and system for controlling a fleet of at least two autonomous/remotely operated vehicles.

BACKGROUND OF THE INVENTION

Autonomous vehicles, such as autonomous trucks and cars, are known to use advanced algorithms, decision logic schemes and artificial intelligence (AI) to introduce an artificial control method and eliminate the need for a human driver. An increased level of automation could make transportation of goods and people both more efficient and cost effective.

Vehicles that operate autonomously use data from sensors observing the environment of the vehicle, such as visibility and presence of pedestrians, as well as sensors observing the properties of the vehicle, such as its speed or acceleration. The algorithms, decision logic schemes or AI uses the available sensor data for deriving a proper way to manoeuvre the vehicle through said environment. The safety and reliability of an autonomous vehicle depends in part on the performance of the sensors and in part on the performance of the implementation of the autonomous control.

A problem with autonomous vehicles is that the safety of operating such vehicles cannot always be guaranteed and legislation may prevent them from being used in complicated road situations where the confidence level of the autonomous control is low, for instance in situations with much traffic.

To circumvent these issues traditional solutions include it has been proposed using a human observer that continuously monitors the operation of the vehicle and is prepared to assume control in situations when the artificial control is deemed insufficient or unsafe. However, using a human observer that continuously monitors the vehicle may at least partly defeats the purpose of autonomous vehicle not needing a human driver.

To this end, it has been proposed that an autonomous vehicle can "ask" for help when it cannot take a decision. See for example US2015248131 and US2016370801.

Furthermore, teleoperation of an (otherwise) autonomous vehicle has been proposed. The Applicant of the present application, Einride AB, has for example demonstrated a 5G-connected transportation solution wherein a human user can teleoperate Einride's autonomous, all-electric, cab-less truck ("pod"). That is, the user can remotely drive the truck from a remote location relative to the truck.

However, if a (large) fleet of vehicles is to be monitored or remotely driven, a transportation service provider has to figure out how many human observers or teleoperators are needed to handle the fleet. Too many, and the system is not as efficient as it could be. Too few, and there is a risk that vehicles are stranded on the roads.

SUMMARY OF THE INVENTION

In view of the above, it is an object of the present invention to provide an improved method for efficiently and safely controlling a fleet of autonomous/remotely operated vehicles.

The invention is defined by the appended independent claims, with embodiments being set forth in the appended dependent claims, in the following description, and in the drawings.

According to a first aspect of the inventive concept, there is provided a method for controlling a fleet of at least two autonomous/remotely operated vehicles, wherein the method comprises:

assigning to each of said at least two autonomous/remotely operated vehicles a pre-determined route comprising a (second) road segment which requires that a teleoperator of a remote operation station assists and/or drives the autonomous/remotely operated vehicle, determining a time overlap of said road segments of the pre-determined routes assigned to the at least two autonomous/remotely operated vehicles, and based on the determined time overlap, inserting a delay or a speedup in a (first) road segment of the pre-determined route of at least one of said at least two autonomous/remotely operated vehicles, which road segment is to be autonomously driven and precedes the road segment which requires that a teleoperator of a remote operation station assists and/or drives the autonomous/remotely operated vehicle, so that said (second) road segments no longer overlap in time.

The present invention is at least partly based on the understanding that by using pre-determined routes with road segments which each may have an associated driving mode (e.g. autonomous driving or remote driving), it becomes possible to predict approximately when an autonomous/remotely operated vehicle will drive autonomously and when it will (be in a driving mode that) require that a teleoperator of a remote operation station assists and/or drives the autonomously/remotely operated vehicle. However, when operating a fleet of autonomously/remotely driven vehicles, the need for assistance or driving by a teleoperator might occur or be planned to occur at the same time for several vehicles. To this end, the present invention is further based on the understanding that by adjusting the first autonomous drive road segment of the route of at least one of two autonomously/remotely driven vehicles, i.e. inserting a delay or a speedup, they may not need assistance or remote driving at the same time. Thus, peaks in demand can be removed, and fewer teleoperators are needed. Furthermore, as the pre-determined routes in transportation usually have an arrival time interval, an autonomously/remotely driven vehicle whose route has an inserted delay can still arrive in time. Furthermore, safety is provided in that an autonomously/remotely driven vehicle whose route has an inserted delay may stay a longer time in the first road segment which is to be autonomously driven rather than entering the subsequent second road segment without a teleoperator.

That a route is pre-determined may be construed as it is known (e.g. start and end locations, directions, and at least start time of the route) before it is driven. The pre-determined route could alternatively be referred to as a pre-planned route, or simply planned route.

Furthermore, a road segment may be construed as an area of the route where the autonomous/remotely operated vehicle may drive, for example a public road (section), a roundabout, an intersection, a fenced area, a highway, etc.

Furthermore, the road segments and driving modes of the pre-determined routes may for example be retrieved from a (previously compiled) database which includes road segments and associated driving modes for a (greater) geographical area in which the pre-determined routes run. Each pre-determined route may alternatively be divided into road segments, and a driving mode may be associated to each of those road segments.

In some embodiments, the method further comprises causing the at least two autonomous/remotely operated vehicles to travel along the pre-determined routes with the inserted delay or speedup in said road segment of at least one of said at least two autonomous/remotely operated vehicles. This may include transmitting the pre-determined routes (along with the road segments and driving modes) and/with the delay/speedup to the autonomous/remotely operated vehicles, wherein at least one of the autonomous/remotely operated vehicles autonomously drives its first road segment, and wherein the teleoperator first assists and/or drives one of the autonomous/remotely operated vehicles in its second subsequent road segment and then the same teleoperator may assist and/or drive the other autonomous/remotely operated vehicles in its second subsequent road segment.

In some embodiments, the delay or speedup in said road segment of the pre-determined route of an autonomous/remotely operated vehicle of said at least two autonomous/remotely operated vehicles is realized by that autonomous/remotely operated vehicle slowing down or speeding up, respectively, in said road segment. For example, the one autonomous/remotely operated vehicle may travel at a lower speed than normal in the first road segment so that it does not reach the subsequent second road segment until the other autonomous/remotely operated vehicle has exited its subsequent second road segment. In another example, the one autonomous/remotely operated vehicle may travel at a higher (yet legal) speed than normal in the first road segment so that can exit the subsequent second road segment before the other autonomous/remotely operated vehicle reaches its subsequent second road segment.

In some embodiments, the delay (or speedup) in said road segment of the pre-determined route of an autonomous/remotely operated vehicle of said at least two autonomous/remotely operated vehicles in realized by that autonomous/remotely operated vehicle stopping in said road segment, for example in lane or on the verge of the road.

In some embodiments, the delay (or speedup) in said road segment of the pre-determined route of an autonomous/remotely operated vehicle of said at least two autonomous/remotely operated vehicles is realized by that autonomous/remotely operated vehicle driving in a holding pattern at least starting in said road segment. That autonomous/remotely operated vehicle may for example autonomously drive one or more times around a block of buildings.

In some embodiments, the delay (or speedup) in said road segment of the pre-determined route of an autonomous/remotely operated vehicle of said at least two autonomous/remotely operated vehicles is realized by that autonomous/remotely operated vehicle re-routing from said road segment and driving along at least one adjoining road segment which is to be autonomously driven, whereby that autonomous/remotely operated vehicle can autonomously drive a longer distance/time than initially planned.

In some embodiments, the delay or speedup is inserted in said road segment of the pre-determined route of an autonomous/remotely operated vehicle of said at least two autonomous/remotely operated vehicles so that an arrival time interval of the pre-determined route of that autonomous/remotely operated vehicle is not exceeded or fallen short of (i.e. so that that autonomous/remotely operated vehicle does not arrive after or before the arrival time interval). As mentioned above, pre-determined routes in transportation usually have an arrival time interval, rather than an exact arrival time, e.g. 07:00-08:00 rather than say 07:35. To this end, the present inventor has realized that by inserting the delay or speedup further based on the arrival time interval, efficient utilization of one or more teleoperators can be realized as discussed above, without compromising the delivery time. The determined time overlap could for example be used as a lower limit for the delay, whereas the arrival time interval could be used to determine an upper limit for the delay.

In some embodiments, each of the at least two autonomous/remotely operated vehicle is a road vehicle, preferably without a driver's cab and/or propelled by one or more electric motors, like Einride's aforementioned pod.

Each autonomous/remotely operated vehicle may have different driving modes that the autonomous/remotely operated vehicle can switch between, wherein the driving modes includes a fully autonomous driving mode, at least one driving mode that requires that a teleoperator assists the autonomous/remotely operated vehicle, and a fully remote driving mode, wherein the autonomous/remotely operated vehicle has at least one computer for autonomous/remote operation of the autonomous/remotely operated vehicle, sensors to detect its surroundings, a memory and/or computer data storage storing the driving modes, and wireless communication means to communicate with the remote operation station.

The remote operation station may comprise equipment for allowing the teleoperator to remotely assist and/or drive the autonomous/remotely operated vehicle, said equipment including one or more screens for showing the surroundings of the autonomous/remotely operated vehicle as detected by one or more sensors of the autonomous/remotely operated vehicle, steering means (for example a steering wheel), throttle, and braking means, wherein the remote operation station also has communication means for wirelessly communicating with the autonomous/remotely operated vehicles.

At least one of the at least two autonomous/remotely operated vehicles may autonomously drive its road segment with the inserted delay or speedup, wherein the teleoperator first assists and/or drives one of said at least two autonomous/remotely operated vehicles in its road segment which requires that a teleoperator of a remote operation station assists and/or drives the autonomous/remotely operated vehicle and then the teleoperator assists and/or drives another one of said at least two autonomous/remotely operated vehicles in its road segment which requires that a teleoperator of a remote operation station assists and/or drives the autonomous/remotely operated vehicle.

According to a second aspect of the inventive concept, there is provided a system for controlling a fleet of at least two autonomous/remotely operated vehicles, wherein the system is configured to:

assign to each of said at least two autonomous/remotely operated vehicles a pre-determined route comprising a road segment which requires that a teleoperator of a remote operation station assists and/or drives the autonomous/remotely operated vehicle, determine a time overlap of said road segments of the pre-determined routes assigned to the at least two autonomous/remotely operated vehicles, and based on the determined time overlap, insert a delay or speedup in a road segment of the pre-determined route of at least one of said at least two autonomous/remotely operated vehicles, which road segment is to be autonomously driven and precedes the road segment which requires that a teleoperator of a remote operation station assists and/or drives the autonomous/remotely operated vehicle, so that said road segments no longer overlap in time.

This aspect may exhibit the same or similar features and technical effects as the first aspect, and vice-versa. For example, the system may (further) be configured to cause at least one of the at least two autonomous/remotely operated vehicles to autonomously drive its road segment with the inserted delay or speedup. Furthermore, the teleoperator may in operation first assist and/or drive one of said at least two autonomous/remotely operated vehicles in its road segment which requires that a teleoperator of a remote operation station assists and/or drives the autonomous/remotely operated vehicle and then the teleoperator assists and/or drives another one of said at least two autonomous/remotely operated vehicles in its road segment which requires that a teleoperator of a remote operation station assists and/or drives the autonomous/remotely operated vehicle.

BRIEF DESCRIPTION OF THE DRAWINGS

These and other aspects of the present invention will now be described in more detail, with reference to the appended drawings showing exemplary embodiments of the present invention.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Figure 1:
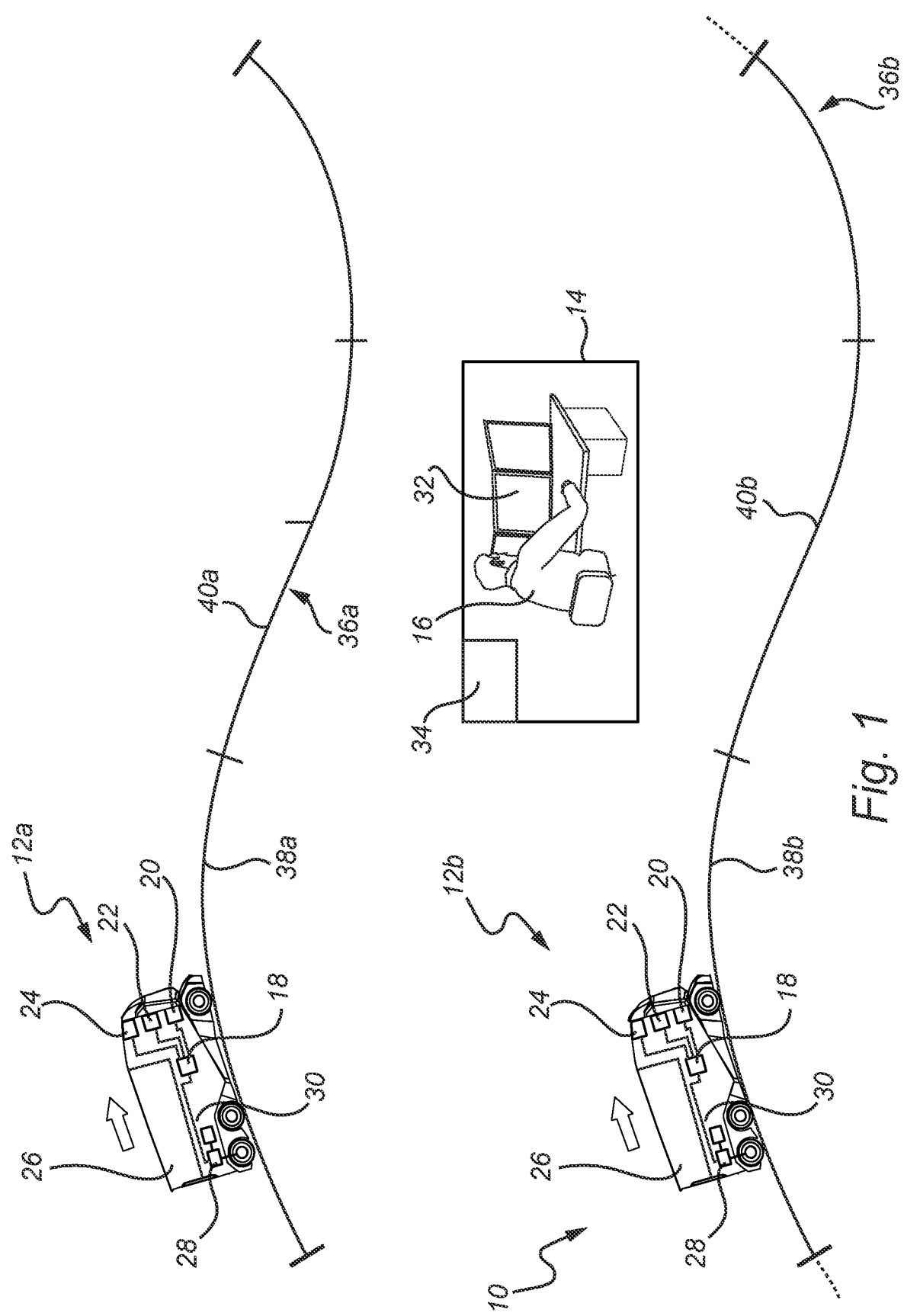
FIG. 1 schematically illustrates a remote operation station and two autonomous/remotely operated vehicle driving along pre-determined routes.

FIG. 1 illustrates a fleet 10 of autonomous/remotely operated vehicles, here a first autonomous/remotely operated vehicle 12*a* and a second autonomous/remotely operated vehicle 12*b*, as well as a remote operation station 14. It should however be stressed that the fleet 10 indeed could include more than two autonomous/remotely operated vehicles.

Each autonomous/remotely operated vehicle 12*a,b* is preferably a (wheeled) road vehicle. The autonomous/remotely operated vehicle 12*a,b* may have several different driving modes that the vehicle 12*a,b* can switch between. The driving modes may include a fully autonomous driving mode (no human input), at least one driving mode that requires that a human teleoperator 16 assists the autonomous/remotely operated vehicle 12*a,b* (wherein the teleoperator 16 monitors and/or confirms otherwise autonomous driving), and a fully remote driving mode (wherein the teleoperator 16 drives the autonomous/remotely operated vehicle 12*a,b* from the remote operation station 14). To this end, the autonomous/remotely operated vehicle 12*a,b* may have at least one computer 18 for (autonomous/remote) operation of the autonomous/remotely operated vehicle 12*a, b*, various sensors 20 to detect its surroundings, a memory and/or computer data storage 22 storing e.g. the driving modes, and wireless communication means 24 (e.g. 5G) to communicate with the remote operation station 14.

Various driving modes that require that a human teleoperator assists the autonomous/remotely operated vehicle (wherein the teleoperator monitors and/or confirms otherwise autonomous driving) are described in Applicant's co-pending patent application entitled METHOD FOR CONTROLLING AN AUTONOMOUS/REMOTELY OPERATED VEHICLE ALONG A PRE-DETERMINED ROUTE, the contents of which herein in incorporated by reference.

Furthermore, the autonomous/remotely operated vehicle 12*a,b* may be a transport vehicle, with a trailer 26 for pallets, timber, perishable goods, etc. Furthermore, the autonomous/remotely operated vehicle 12*a,b* may be an all-electric vehicle, propelled by at least one electric motor 28 powered by a battery 30. The autonomous/remotely operated vehicle 12*a,b* may also be devoid of a driver's cab, thereby it cannot be driven manually by a driver in the vehicle 12*a,b*.

The remote operation station 14 accommodates the teleoperator 16 and typically one or more additional teleoperators. The remote operation station 14 also comprises equipment 32 for allowing the teleoperator(s) 16 to remotely assist and/or drive the autonomous/remotely operated vehicle 12*a,b* of the fleet 10. The equipment 32 may include one or more screens for showing the surroundings of the autonomous/remotely operated vehicle 12*a,b* (as detected by one or more of the sensors 20), a steering wheel, throttle, braking means, etc. The remote operation station 14 may also have communication means 34 for wirelessly communicating with the autonomous/remotely operated vehicles 12*a,b*. The remote operation station 14 may be at a single physical location or distributed over several locations.

Also shown in FIG. 1 is a first pre-determined route 36*a* of autonomous/remotely operated vehicle 12*a* and a second pre-determined route 36*b* of autonomous/remotely operated vehicle 12*b*, as will be described further below.

Figure 2:
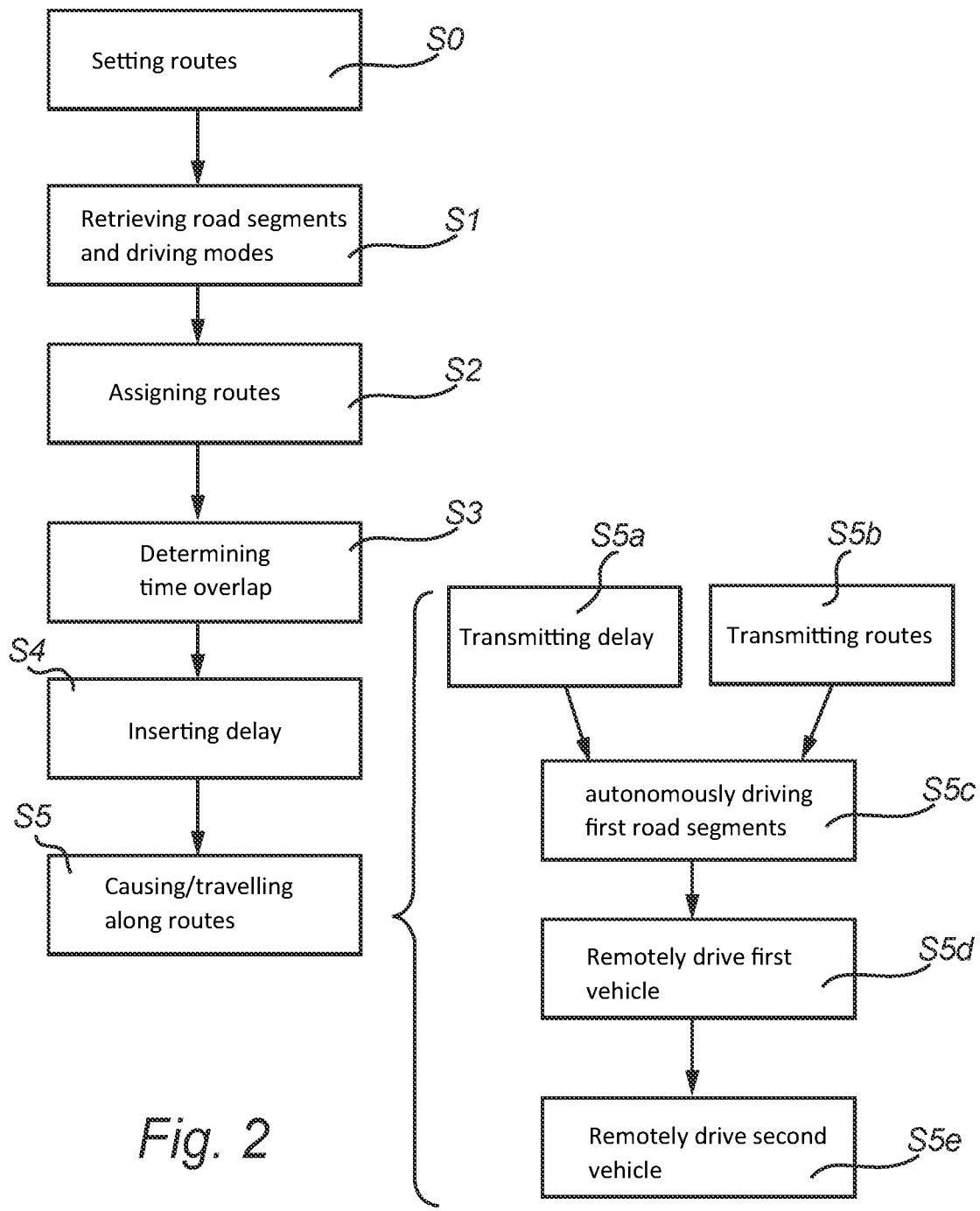
FIG. 2 is a flow chart of a method according to one or more embodiments of the present invention.

A method for controlling the fleet 10 will now be described, further with reference to FIGS. 2 and 3. The method may be (at least partly) computer-implemented, i.e. involve one or more computers or the like, wherein at least one feature is realised by means of a computer program (software).

The aforementioned pre-determined routes 36*a,b* may initially be set/decided/planned, for example by a transportation service provider, at S0. The pre-determined routes 36a,b may for example start at the same distributer's logistics centre and end at different store locations. The transportation service provider may also operate the remote operation station 14. Furthermore, each route 36a,b is pre-determined in that it is known (e.g. start and end locations, directions, and at least start time of the route) some time before it is driven.

Each pre-determined routes 36a,b may comprise a first road segment 38a,b which is to be autonomously driven, e.g. using the aforementioned fully autonomous driving mode. Please note that although denoted "first" road segment 38a,b, it does not have to be the very first road segment of the route 36a,b. Each pre-determined routes 36a,b may further comprise a subsequent (next) second road segment 40a,b which is to be driven in a driving mode that requires that a teleoperator 16 of the remote operation station 14 assists and/or drives the autonomous/remotely operated vehicle, for example using the aforementioned driving mode that requires that a human teleoperator 16 assists the vehicle or the aforementioned fully remote driving mode. That is, the first road segment 38a,b precedes the second road segment 40a,b.

The road segments 38,b and 40a,b and associated driving modes of the pre-determined routes 36a,b may for example be retrieved at S1 (e.g. by the aforementioned transportation service provider) from a database which includes road segments and associated driving modes for a geographical area in which the pre-determined routes 36a,b run.

At S2, the method includes assigning the first pre-determined route 36a to the first autonomous/remotely operated vehicle 12a and assigning the second pre-determined route 36b to the second autonomous/remotely operated vehicle 12b. This step could be performed by the transportation service provider.

Figure 3A:
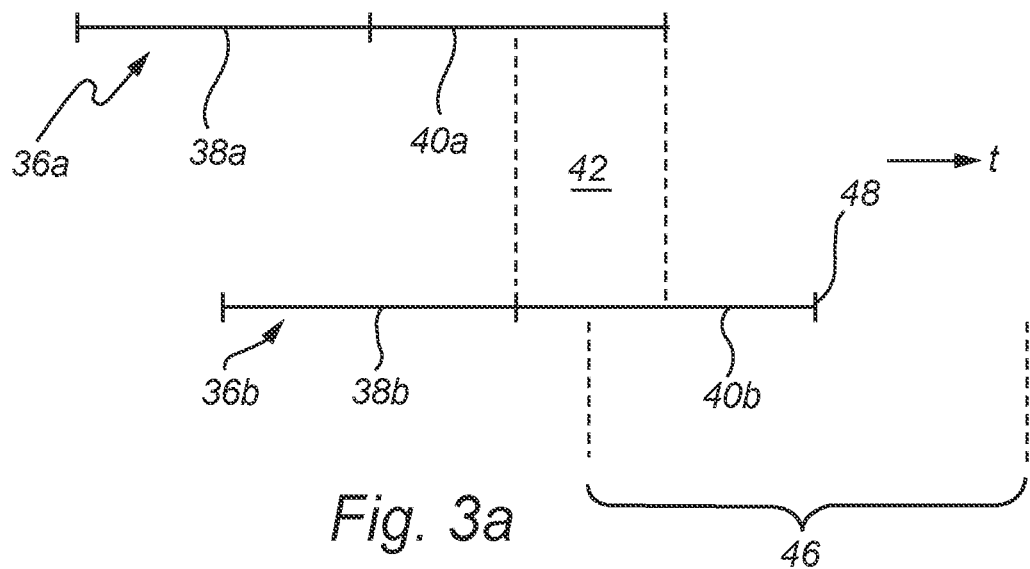
FIGS. 3*a-b* illustrate the pre-determined routes in the time domain, before (3*a*) and after (3*b*) insertion of a delay in one of the routes.

At S3, the method determines a time overlap 42 of the second road segments 40a,b of the pre-determined routes 36a,b assigned to the autonomous/remotely operated vehicles 12a,b, as illustrated in FIG. 3a. It could for example be that the subsequent second road segments 40a,b overlap between 10:10 and 10:15 o'clock. This step could be performed by the transportation service provider or the remote operation station 14.

Figure 3B:
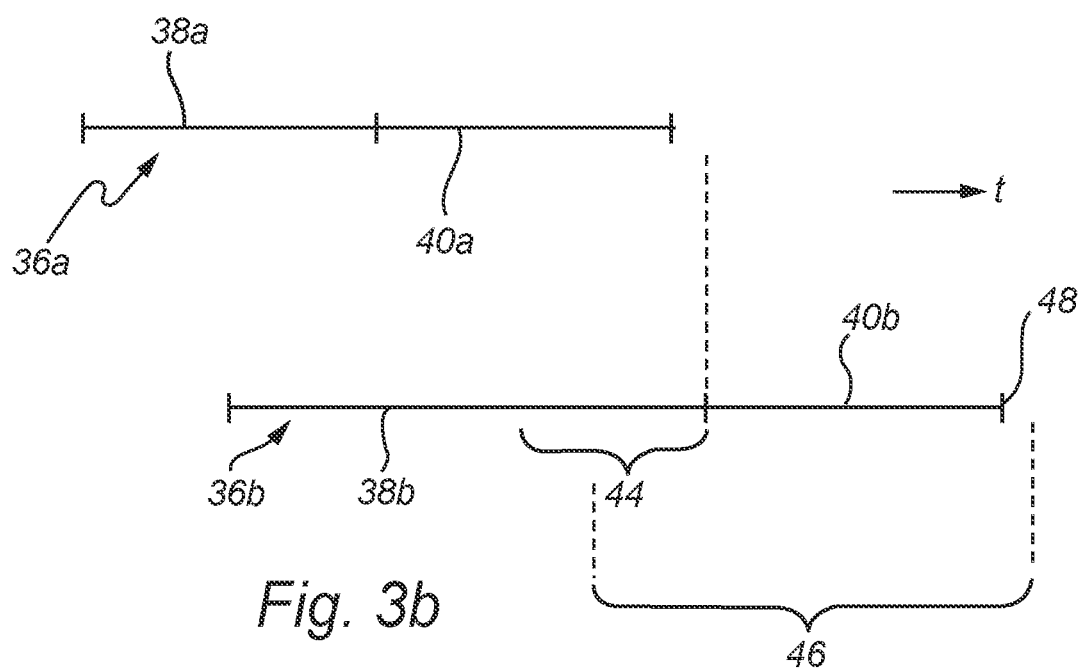

Based on the determined time overlap 42 in step S3, the method at S4 inserts a delay 44 (or speedup) in the first road segment 38b of the pre-determined route 36b of one of the autonomous/remotely operated vehicles—here the second autonomous/remotely operated vehicle 12b—so that the second segments 40a,b no longer overlap in time, see FIG. 3b. The delay 44 should be at least as long as the time overlap 42, i.e. at least 5 minutes for the example in the previous paragraph. That is, the duration of the first road segment 38b is extended by 5 minutes. A corresponding exemplary speedup could be −5 minutes, i.e. the duration of the first road segment 38b is shortened by 5 minutes. This step could be performed by the transportation service provider or the remote operation station 14.

Furthermore, the delay 44 may be inserted in the first road segment 40b so that an arrival time interval 46 of the pre-determined route 36b of the second autonomous/remotely operated vehicle 12b is not exceeded. For an arrival time interval 46 of say 20 minutes, which arrival time interval 46 typically is centred about an estimated time of arrival 48 of the pre-determined route 36b, it means that the delay 44 should be no longer than 10 minutes. Hence, in conjunction with the example in the previous paragraph, the exemplary delay 44 may be: 5 min<delay 44<10 min.

If the fleet 10 also comprises a third autonomous/remotely operated vehicles whose subsequent second road segment overlaps in time with the road segments 40a,b, a suitable delay or speedup could be inserted in its first road segment to remove the overlap, whereby also the third autonomous/remotely operated vehicle could be handled by the teleoperator 16, and so on.

It should be noted that S2 could be performed after S3 and S4.

Figure 4A:
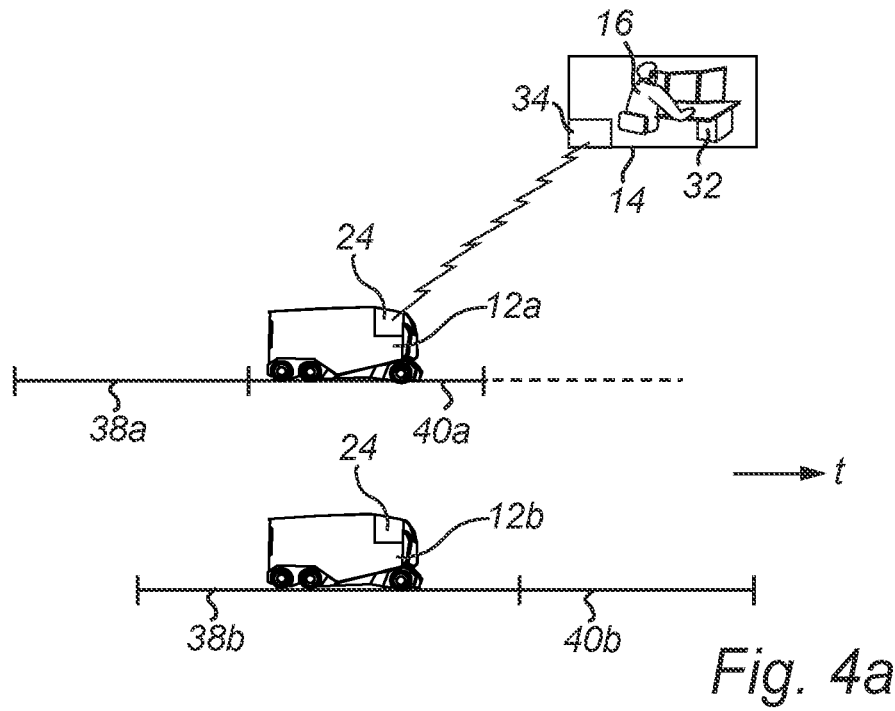
FIGS. 4*a-b* illustrate teleoperation of the routes of FIG. 3*b*.
Figure 4B:
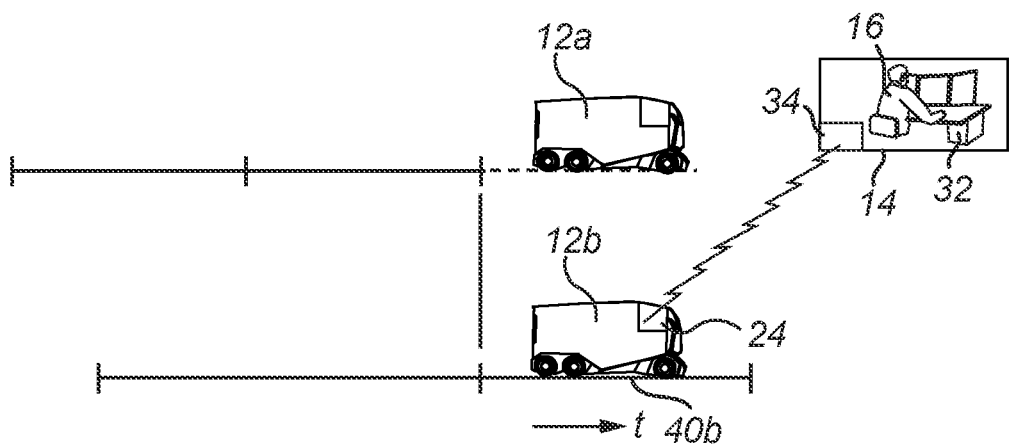

The method may further comprise causing (S5) the autonomous/remotely operated vehicles 12a,b to travel along the pre-determined routes 36a,b with the inserted delay 44 in the first road segment 38b of the second autonomous/remotely operated vehicle 12b. This may in turn include transmitting (S5a) the pre-determined routes 36a,b along with the road segments and driving modes to the autonomous/remotely operated vehicles 12a,b (e.g. using communication means 34 and 24) and transmitting (S5b) also the delay (or speedup) to one of the vehicles 12a,b (e.g. using communication means 34 and 24)*, wherein the autonomous/remotely operated vehicles 12a,b autonomously drive (S5c) their first road segments 38a,b including the delay 44 in the first road segment 38b, and wherein the teleoperator 16 first assists and/or drives the first autonomous/remotely operated vehicle 12a in its second road segment 40a (S5d; FIG. 4a) and then the same teleoperator 16 assists and/or drives the second autonomous/remotely operated vehicle 12b in its second subsequent road segment 40b while the first autonomous/remotely operated vehicle 12a for example may have be in a subsequent road segment which is autonomously driven (S5e; FIG. 4b). Namely, the teleoperator 14 assists and/or drives the autonomous/remotely operated vehicles 12a,b using the equipment 32, whereby various control signals (steering, throttle, confirmations, etc.) may be sent from the remote operation station 14 to the autonomous/remotely operated vehicles 12a,b using the communication means 34 and 24.

*The autonomous/remotely operated vehicles 12a,b may store the (received) pre-determined routes 36a,b, the road segments 38a-b and 40a-b, driving modes, and any delay 44 in the memory and/or computer data storage 22.

It should be noted that S5a and S5b could be combined. Also, only the delay 44 may be transmitted (S5b), in case the autonomous/remotely operated vehicles 12a,b have the pre-determined routes 36a,b beforehand.

FIGS. 5a-d illustrates how the inserted delay 44 in the first (autonomous drive) road segment 38b of the pre-determined route 36b can be realized (implemented) by the second autonomous/remotely operated vehicle 12b.

Figure 5A:
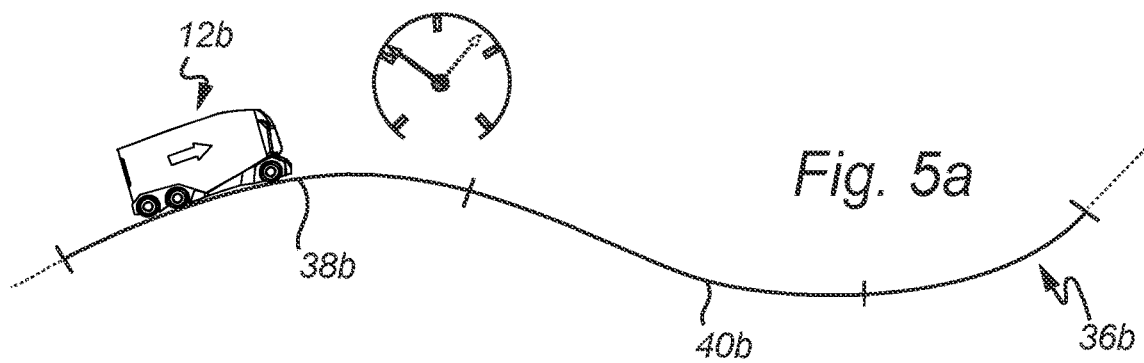
FIGS. 5*a-d* schematically illustrates how a delay can be realized.

In FIG. 5a, the delay 44 is realized by the autonomous/remotely operated vehicle 12b slowing down in the first road segment 38b, so that it travels at a lower speed than normal.

Figure 5B:
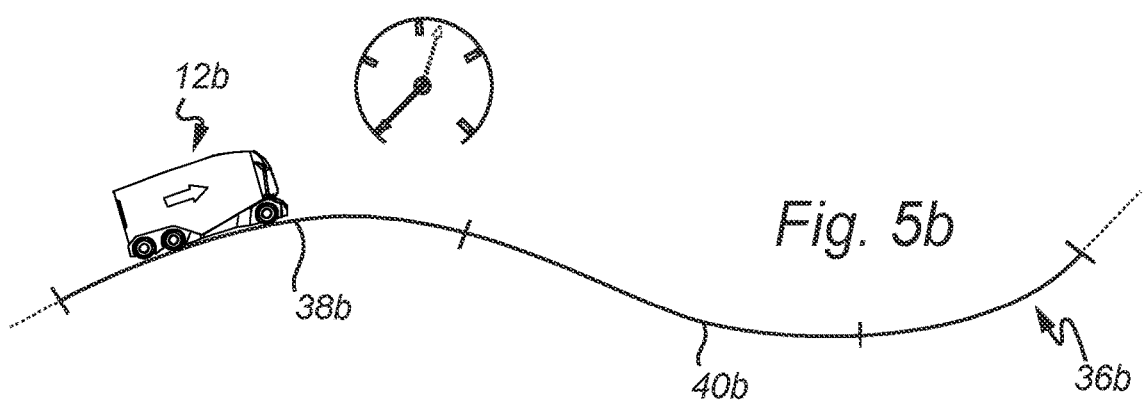

In FIG. 5b, the delay 44 is realized by the autonomous/remotely operated vehicle 12b stopping temporarily in the first road segment 38b before it reaches the subsequent second road segment 40b.

Figure 5C:
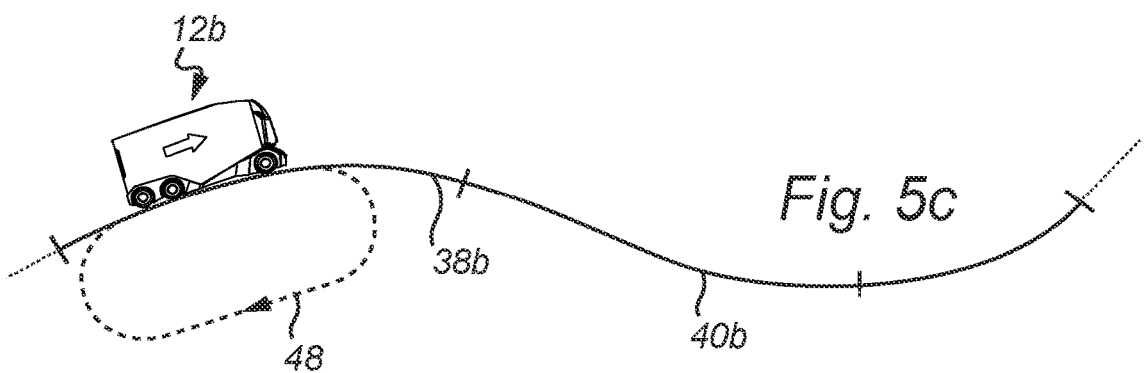

In FIG. 5c, the delay 44 is realized by the autonomous/remotely operated vehicle 12b driving in a holding pattern 48, for example driving around a block of buildings in the first road segment 38b.

Figure 5D:
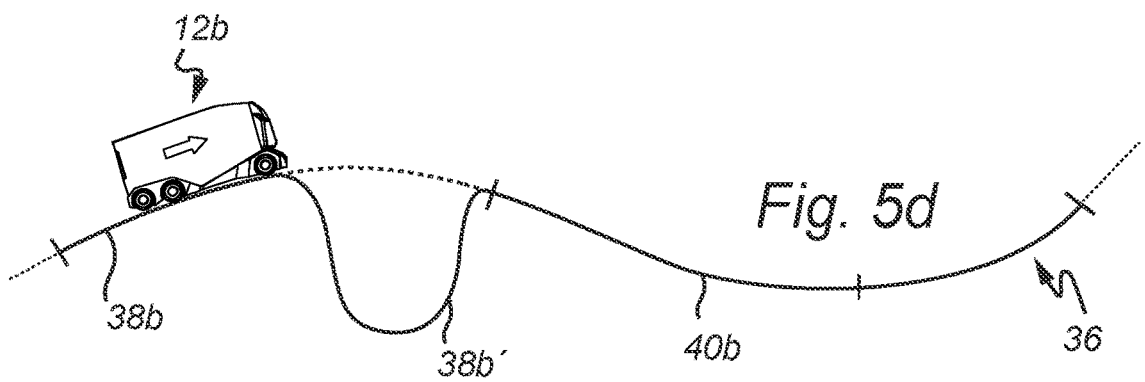

In FIG. 5d, the delay 44 is realized by the autonomous/remotely operated vehicle 12b re-routing from the first road segment 38b and driving along at least one adjoining road segment 38b' which is to be autonomously driven, so that it drives longer than initially planned before reaching the next second road segment 40b.

The autonomous/remotely operated vehicle 12b may be configured to determine which option (FIGS. 5a-d) to use to implement the delay 44. Alternatively, it can be instructed how to implement the delay 44, for example along with the transmission of the delay in the aforementioned step S5b.

The skilled person in the art realizes that the present invention by no means is limited to the embodiments described above. The features of the described embodiments may be combined in different ways, and many modifications and variations are possible within the scope of the appended claims.

For example, the predetermined route 36a of the autonomous/remotely operated vehicle 12a could be devoid of the first road segment 38a.

Furthermore, in addition to inserting a delay 44 in the first road segment 38b, a speedup could also be inserted in the first road segment 38a, such that the road segments 40a-b do not overlap in time.

Finally, the word "comprising" does not exclude the presence of other elements or steps than those listed in the claim. The word "a" or "an" preceding an element does not exclude the presence of a plurality of such elements.

The invention claimed is:

1. A computerized system for controlling a fleet of at least two autonomous vehicles, wherein each autonomous vehicle has different driving modes that the autonomous vehicle can switch between, wherein the driving modes include a fully autonomous driving mode, at least one driving mode that requires that a teleoperator assists the autonomous vehicle wherein the teleoperator monitors or confirms otherwise autonomous driving, and a fully remote driving mode wherein the teleoperator drives the autonomous vehicle from a remote operation station, wherein each of the autonomous vehicles has at least one computer for autonomous and remote operation of the autonomous vehicle, sensors to detect surroundings of the autonomous vehicle, a least one of a memory and computer data storage storing the driving modes, and wireless communication means to communicate with a remote operation station, wherein the computerized system is configured to:

assign to each of said at least two autonomous vehicles a predetermined route comprising a second road segment which requires that a teleoperator of the remote operation station either assists or drives the autonomous vehicle, wherein the remote operation station comprises equipment for allowing the teleoperator to remotely assist and drive the autonomous vehicle, said equipment including one or more screens for showing the surroundings of the autonomous vehicle as detected by one or more of said sensors of the autonomous vehicle, steering means, throttle, and braking means, wherein the remote operation station also has communication means for wirelessly communicating with the autonomous vehicles, determine a time overlap of said second road segments of the predetermined routes assigned to the at least two autonomous vehicles, based on the determined time overlap, insert a delay or a speedup in a first road segment of the predetermined route of at least one of said at least two autonomous vehicles, the first road segment is to be autonomously driven and precedes the second road segment which requires that the teleoperator of the remote operation station either assists or drives the autonomous vehicle, so that said second road segments no longer overlap in time, and cause the at least two autonomous vehicles to autonomously drive their first road segments including the inserted delay or speedup in said first road segment of the at least one of said at least two autonomous vehicles, wherein the delay or speedup is inserted in said first road segment of the predetermined route of the at least one autonomous vehicle of said at least two autonomous vehicles so that an arrival time interval of the predetermined route of that autonomous vehicle is not exceeded or fallen short of.

2. The computerized system of claim 1, wherein the delay or speedup in said first road segment of the predetermined route of the at least one autonomous vehicle of said at least two autonomous vehicles is realized by that autonomous vehicle slowing down or speeding up in said first road segment.

3. The computerized system of claim 1, wherein the delay or speedup in said first road segment of the predetermined route of the at least one autonomous vehicle of said at least two autonomous vehicles is realized by that autonomous vehicle stopping in said first road segment.

4. The computerized system of claim 1, wherein the delay or speedup in said first road segment of the predetermined route of the at least one autonomous vehicle of said at least two autonomous vehicles is realized by that autonomous vehicle driving in a holding pattern at least starting in said first road segment.

5. The computerized system of claim 1, wherein the delay or speedup in said first road segment of the predetermined route of the at least one autonomous vehicle of said at least two autonomous vehicles is realized by that autonomous vehicle re-routing from said first road segment and driving along at least one adjoining road segment which is to be autonomously driven.

6. The computerized system of claim 1, wherein each of the at least two vehicles autonomous vehicles is a road vehicle without a driver's cab and/or propelled by one or more electric motors.

7. The computerized system of claim 1, wherein the computerized system retrieves the first road segments of the predetermined routes and the second road segments of the predetermined routes from a database.

8. The computerized system of claim 1, wherein the computerized system transmits instructions including the respective predetermined routes, road segments, driving modes and delays or speedups to memories of the respective autonomous vehicles, wherein causing the at least two autonomous vehicles to autonomously drive their first road segments includes reading and executing the transmitted instructions.

9. A computerized method for controlling a fleet of at least two autonomous vehicles, wherein each autonomous vehicle has different driving modes that the autonomous vehicle can switch between, wherein the driving modes include a fully autonomous driving mode, at least one driving mode that requires that a teleoperator assist the autonomous vehicle wherein the teleoperator monitors or confirms otherwise autonomous driving, and a fully remote driving mode wherein the teleoperator drives the autonomous vehicle from a remote operation station, the computerized method comprising the steps of:

assigning to each of said at least two autonomous vehicles a predetermined route including a second road segment which requires that a teleoperator of the remote operation station either assists or drives the autonomous vehicle, determining a time overlap of said second road segments of the predetermined routes assigned to the at least two autonomous vehicles;

based on the determined time overlap, inserting a delay or a speedup in a first road segment of the predetermined route of at least one of said at least two autonomous vehicles, wherein the first road segment is to be autonomously driven and precedes the second road segment which requires that the teleoperator of the remote operation station either assists or drives the autonomous vehicle, so that said second road segments no longer overlap in time, and sending an order to the at least two autonomous vehicles to autonomously drive their first road segments including the inserted delay or speedup in said first road segment of the at least one of said at least two autonomous vehicles, wherein the delay or speedup is inserted in said first road segment of the predetermined route of the at least one autonomous vehicle of said at least two autonomous vehicles so that an arrival time interval of the predetermined route of that autonomous vehicle is not exceeded or fallen short of.

10. The computerized method of claim 9, wherein the delay or speedup in said first road segment of the predetermined route of the at least one autonomous vehicle of said at least two autonomous vehicles is realized by that autonomous vehicle slowing down or speeding up in said first road segment.

11. The computerized method of claim 9, wherein the delay or speedup in said first road segment of the predetermined route of the at least one autonomous vehicle of said at least two autonomous vehicles is realized by that autonomous vehicle stopping in said first road segment.

12. The computerized method of claim 9, wherein the delay or speedup in said first road segment of the predetermined route of the at least one autonomous vehicle of said at least two autonomous vehicles is realized by that autonomous vehicle driving in a holding pattern at least starting in said first road segment.

13. The computerized method of claim 9, wherein the delay or speedup in said first road segment of the predetermined route of the at least one autonomous vehicle of said at least two autonomous vehicles is realized by that autonomous vehicle re-routing from said first road segment and driving along at least one adjoining road segment which is to be autonomously driven.

14. The computerized method of claim 9, wherein each of the at least two autonomous vehicles is a road vehicle without a driver's cab and/or propelled by one or more electric motors.

15. The computerized method of claim 9, further comprising:
retrieving by the computerized system the first road segments of the predetermined routes and the second road segments of the predetermined routes from a database.

16. The computerized method of claim 9, further comprising:
storing in a memory of the at least one autonomous vehicle the first road segment of the predetermined routes, including the delay and the speedup, prior to the computerized system assigning the predetermined route comprising the second road segment to the at least one autonomous vehicle.

17. A computerized system, comprising:
a plurality of autonomous vehicles, wherein each autonomous vehicle comprises a computer, sensors to detect the autonomous vehicle's surroundings, a wireless transceiver to communicate with a remote operation station, a memory that stores a plurality of driving modes that the autonomous vehicle can switch between, wherein the plurality of driving modes comprise a fully autonomous mode, a teleoperator assistance mode wherein a teleoperator monitors or otherwise confirms autonomous driving, and a fully remote driving mode wherein the teleoperator drives the autonomous vehicle;

a remote operation station configured to support a teleoperator, comprising a screen that displays surroundings of at least one autonomous vehicle of the plurality of autonomous vehicles as detected by the sensors of the at least one autonomous vehicle, a steering device, a throttle, brakes, and a transceiver to wirelessly communicate with the at least one autonomous vehicle; and an autonomous vehicle fleet management computer that:
assigns to at least two autonomous vehicles of the plurality of autonomous vehicles a predetermined route comprising a second road segment which requires that the teleoperator of the remote operation station either assists or drives at least one autonomous vehicle of the at least two autonomous vehicles;

determines a time overlap of the second road segments of the predetermined routes assigned to the at least two autonomous vehicles, and inserts a delay or a speedup in a first road segment of the predetermined route of at least one of said at least two autonomous vehicles based on the determined time overlap, wherein the first road segment is to be autonomously driven by the at least one autonomous vehicle and precedes the second road segment which requires that the teleoperator either assists or drives the autonomous vehicle, so that the second road segments of the predetermined routes assigned to the at least two autonomous vehicles no longer overlap in time, and instructs the at least two autonomous vehicles to autonomously drive their first road segments including the inserted delay or speedup in the first road segment of the at least one autonomous vehicle of the at least two autonomous vehicles, wherein the delay or speedup is inserted in said first road segment of the predetermined route of the at least one autonomous vehicle of the at least two autonomous vehicles so that an arrival time interval of the predetermined route of that autonomous vehicle is not exceeded or fallen short of.

18. The computerized system of claim 17, wherein the delay or speedup in the first road segment of the predetermined route of the at least one autonomous vehicle of the at least two autonomous vehicles is realized by that autonomous vehicle slowing down or speeding up in the first road segment.

19. The computerized system of claim 17, wherein the delay or speedup in the first road segment of the predetermined route of the at least one autonomous vehicle of the at least two autonomous vehicles is realized by that autonomous vehicle stopping in the first road segment.

20. The computerized system of claim 17, wherein the delay or speedup in the first road segment of the predetermined route of the at least one autonomous vehicle of the at least two autonomous vehicles is realized by that autonomous vehicle driving in a holding pattern at least starting in the first road segment.

* * * * *